Patented July 10, 1951

2,560,182

UNITED STATES PATENT OFFICE 2,560,182

PREPARATION OF BLUE-VEINED CHEESE

Frank Eugene Nelson and Isaac I. Peters, Ames, Iowa, assignors to Iowa State College Research Foundation, Ames, Iowa, a corporation of Iowa No Drawing. Application January 19, 1948, Serial No. 3,176

8 Claims. (Cl. 99—116)

This invention relates to the preparation of blue-veined cheese. The invention is particularly useful in the manufacture of blue-veined cheese from milk through the use of a microbial lipolytic enzyme system.

Research has discovered that the sharp peppery flavor characteristic of blue-veined or Roquefort-type cheese is due to the accumulation of caproic, caprylic and capric acids, their easily hydrolyzable salts and the methyl ketones which are derived from them by microbial action. Presumably, these products result from hydrolysis of some of the butterfat by the natural lipolytic enzymes present in milk and from the action of the Penicillium mold in the cheese.

Increasing the action of the lipolytic enzymes of milk by procedures which disperse the fat in globules smaller than those naturally occurring in cow's milk has become a common practice in the industry. Attempts to increase the extent of butterfat hydrolysis by introduction of lipolytic enzyme preparations from non-milk sources have been unsuccessful because the characteristics of the enzyme preparations employed have been such that atypical flavor production resulted, in addition to the increased fat degradation which was desired.

Attempts to make blue-veined cheese from pasteurized milk have met with little success, presumably because the pasteurization process inactivates the normal lipolytic enzymes of milk, and thus prevents the normal hydrolysis of butterfat which these enzymes bring about in blue-veined cheese made from raw milk. Addition of lipolytic enzyme systems from non-milk sources has been unsuccessful because the characteristics of the enzyme systems employed have not proven such that the desired degree of fat hydrolysis could be obtained without the production of undesirable off-flavors.

In the manufacture of blue-veined cheese from pasteurized milk, off-flavors commonly occur which apparently are related to the low level of free fatty acids, which acids, in raw-milk cheese, exert a bacteriostatic effect upon certain undesirable organisms which thus ordinarily are kept from developing to the point that definite off-flavors are produced.

An object of the present invention is to provide a process which will improve the flavor, reduce the ripening period, and permit manufacture from pasteurized milk. A further object is to provide a process applicable to pasteurized and raw milk, which will provide a considerable degree of control over the extent of fat lipolysis which occurs in blue-veined cheese, while at the same time eliminating off-flavors commonly associated with the activity of lipase preparations previously employed in the manufacture of blue-veined cheese. Other specific objects and advantages will appear as the specification proceeds.

We have discovered that the addition of the standardized preparation of lipase enzyme obtained from *Mycotorula lipolytica* (also known as *Candida lipolytica*) to milk gives a considerable degree of control over the degree of fat hydrolysis, which occurs in blue-veined cheese made from either raw or pasteurized milk, while at the same time minimizing or eliminating off-flavors, as will be more fully described hereinafter.

The addition of the lipase enzyme system obtained from *Mycotorula lipolytica* to pasteurized milk, and preferably to homogenized, pasteurized milk, causes the resultant cheese to be relatively free from the off-flavors and unnatural flavors commonly found in ripened cheese from such milk. Presumably, a part of this beneficial result arises from the presence of the free fatty acids which are inhibitory to the development of certain micro-organisms commonly causing certain of the defects in question.

The microorganism *Mycotorula lipolytica* produces considerable amounts of an extracellular lipase, which is preferably freed from living organisms to permit preparation of a sterile fluid, which may be standardized for lipase activity and which may be obtained in quantity under proper conditions of growth for *Mycotorula lipolytica*.

The lipolytic enzyme system of *Mycotorula lipolytica* is active over the entire range of pH encountered in the manufacture of blue-veined cheese, whereas most lipases, which have been studied, are most active at a moderate to definitely alkaline reaction and have little activity at the moderately acid reactions characteristic of ripening blue-veined cheese. The Mycotorula lipase has its optimum activity on butterfat at pH 6.2–6.5. The lipase system is found to produce additional fat hydrolysis in the resulting cheese in proportion to the lipase activity of the added enzyme system, thus giving a considerable degree of control over the degree of fat hydrolysis in the cheese.

We have found that by the use of the lipase enzyme system obtained from *Mycotorula lipolytica* blue-veined cheese may be made from pasteurized, homogenized milk and have a flavor which is of an intensity equal to or greater than that of cheese made from homogenized raw milk and of a character very similar to that of raw-milk cheese. The degree of fat degradation and the level of flavor intensity may be predetermined within close limits by the amount of enzyme preparation of known activity added to the product, cheese with objectionably excessive degree of fat degradation and flavor intensity having been made on a number of occasions.

We have found that the blue-veined cheese made from homogenized, pasteurized milk should be made from pasteurized milk which has been cooled to a temperature below 110° F. prior to homogenization, if the character of the curd during making and ripening of the cheese is to be satisfactory.

The lipase enzyme system may be prepared from cultures of Mycotorula lipolytica in any suitable manner. It will be understood that a large number of methods may be employed for the forming of a suitable lipase enzyme system. For example, nutrient broth may be used as the basal medium for lipase production and may contain 5 g. Bacto peptone, 3 g. beef extract, 0.5 g. glucose, 500 ml. distilled water, 230 ml. 0.6 m. disodium phosphate duodecimal hydrate and 270 ml. 0.3 m. citric acid monohydrate. The reaction may be adjusted to pH 4.5. One drop of 24- to 48-hour culture in litmus milk was added to 200 ml. of sterile basal medium in a 500 ml. Erlenmeyer flask stoppered with a cotton plug. Cultures were grown at 30° C. An excellent lipase product was produced in quantity.

In the foregoing example, the 0.05 per cent glucose was found desirable, and lipase production was found increased by the addition of 0.225 m. disodium phosphate plus citric acid buffer to the nutrient broth with a reaction of pH 4.5–5.5. An equal addition of disodium phosphate, plus monopotassium phosphate, gave similar high results.

Growth at 30° C. was found to be optimum for the production of lipase by Mycotorula lipolytica. Quiescent cultures produced considerably more lipase than did aerated cultures or cultures which were shaken periodically. In general, it was found that short oval cells and low lipase activity were associated with conditions favorable for rapid growth, while long slender cells and high lipase activity were associated with conditions slightly less favorable for growth.

Instead of employing nutrient broth as above described, it will be understood that any suitable media may be used, and that the development of the lipase from Mycotorula lipolytica will be well understood by those skilled in this field.

As a specific example of the process, the following may be set out:

Milk pasteurized at 143° F. for 30 minutes, or by a procedure equivalent thereto in microbiological efficiency, and homogenized at a pressure of 1,000 to 4,000 pounds per square inch at a temperature below 110° F. (to minimize the softening effect upon the curd which later was formed), was subjected to the action of a lipase enzyme preparation obtained from Mycotorula lipolytica. The milk was then set at a temperature of 90° F. with one per cent active lactic culture and 3 ounces of rennet extract per 1,000 pounds of milk. After 60 to 90 minutes, the curd was cut and held in the whey for 1.5 to 2 hours. The curd was dipped and then mixed with the mold powder prepared from a strain of Penicillium roqueforti or other mold which had been found to produce desirable and characteristic changes during the ripening of blue-veined or Roquefort-type cheese and with 1.0% to 1.5% salt. The curd was then hooped, salted and allowed to ripen. Any suitable mold powder may be used. We prefer to use Penicillium roqueforti.

As an example of the effect of the lipase upon fat breakdown, in one typical series, the cheese made from pasteurized milk without the addition of the lipase had a volatile acidity value (calculated as ml. of 0.1 N alkali required to neutralize the first 1000 ml. of distillate from 200 g. of cheese) of 7.0 at 4 weeks and 19.5 at 12 weeks, whereas similar values for cheese made from milk to which lipase had been added were 9.0 and 29.3 when 250 lipase units per 110 lb. of milk were used, 10.5 and 33.0 when 375 lipase units were used and 13.0 and 38.2 when 500 units of lipase were used. The flavor intensities of these lots of cheese were roughly proportional to the degree of fat breakdown indicated by the volatile acidity values. In a similar lot of cheese made from milk to which 1300 lipase units had been added, the volatile acidity values were 39 and 85 at 4 and at 12 weeks, respectively, and the cheese was criticized for being excessively sharp in flavor at 12 weeks.

We have found that lipase activity on butterfat over a range of reaction from pH 4.0 to pH 8.0 is shown for lipase obtained from Mycotorula lipolytica, with pH 6.2–6.5 being optimum. The lipase activity on butterfat was demonstrated at temperatures of from 10° to 52° C., the temperatures of 37° C. and above serving to inactivate the enzyme after exposure of some hours' duration. Optimum activity was demonstrated at 28° to 33° C. when incubation periods greater than 48 hours were employed.

A storage temperature of 5° C. was found to be much superior to 25° C. for preserving the enzyme activity in cell-free preparations.

We prefer to use cell-free preparations in the process. Cell-free preparations were obtained from the 3-day old nutrient broth cultures of Mycotorula lipolytica by centrifuging the cultures at 3,500 R. P. M. for 15 minutes, and then filtering the supernatant material through an ultra-fine sintered glass filter with the aid of suction.

Mycotorula lipolytica (or Candida lipolytica) may be identified as follows:

*Morphology*

Form and size: Oval and spherical; oval 2.0 to 3.0 x 5.0 to 7.0 microns, spherical—3.0 to 3.5 microns.
Arrangement: Singly, single bud attached.
Staining reaction: Gram positive.
Spore: None.
Slide culture: Oval blastospores, singly on septate true mycelium (Figure 18).

*Cultural characteristics*

Potato agar slant: Spreading, raised, smooth, glistening, and white.
Potato agar colony: Circular, entire, convex to pulvinate, smooth, glistening, and whitish; 1½ to 4 mm. in diameter.
Gelatin stab.—Liquefaction: Stratiform liquefaction conspicuous in 2 days, completely liquefied in one month.
Malt extract broth.—24 hours: Dry, matte membrane; slightly viscid sediment. 10 days: Thin film; slightly viscid to slightly flocculent sediment.

Biochemical features

Carbohydrate fermentation: no gas production from any sugars.
Carbohydrate utilization: Glucose utilized.
Nitrogen utilization: Peptone, asparagine, ammonium sulphate, and urea utilized.
Hydrolysis of fat: Positive.
Proteolysis: Positive.
Ethyl alcohol utilization: Positive without membrane formation.
Litmus milk: Slight reduction; digestion accompanied by soft coagulation in 2 days; digestion completed in about 2 weeks.

Growth conditions

Oxygen relationship: Aerobic.
Growth temperature: Optimum 21° to 30° C.; growth at 10° C. but not at 37° C.
Heat resistance: No survival at 61.7° C. for 5 minutes.

While, in the foregoing process, we have set forth specific examples in detail for the purpose of illustrating an embodiment of the invention, it will be understood that such details may be varied widely by those skilled in the art without departing from the spirit of our invention.

We claim:

1. In a process for preparing a blue-veined cheese from pasteurized milk, the steps of subjecting the milk to the action of lipase obtained from the culture of *Mycotorula lipolytica*, and under conditions of temperature and hydrogen ion concentration favorable to the action of the lipase, setting the milk to form a curd, separating the curd, and ripening the cheese.

2. In a process of the character set forth for preparing blue-veined cheese from pasterized milk, the steps of subjecting the milk to the action of cell-free lipase obtained from the culture of *Mycotorula lipolytica*, and under conditions of temperature and hydrogen ion concentration favorable to the action of the lipase, setting the milk to form a curd, separating the curd, and ripening the cheese.

3. In a process of the character set forth for preparing blue-veined cheese from milk, the steps of subjecting pasteurized, homogenized milk to the action of lipase obtained from the culture of *Mycotorula lipolytica* and at temperatures of from 10° to 37° C., setting the milk to form a curd, separating the curd, and ripening the cheese.

4. In a process of the character set forth for preparing blue-veined cheese from milk, the steps of preparing from a culture of *Mycotorula lipolytica* a lipase enzyme at a temperature of about 30° C., centrifuging the material to remove the cells from the lipase, adding the lipase to pasteurized and homogenized milk, and maintaining the lipase and milk mixture under conditions of temperature and hydrogen ion concentration favorable to the action of the lipase, setting the milk to form a curd, separating the curd, and ripening the cheese.

5. In a process of the character set forth for preparing blue-veined cheese from milk, the steps of preparing lipase from a culture of *Mycotorula lipolytica*, centrifuging the material to remove the cells from the lipase, and subjecting pasteurized and homogenized milk to the action of said lipase under temperatures of from 10° to 37° C., setting the milk to form a curd, separating the curd, and ripening the cheese.

6. In a process of the character set forth for preparing blue-veined cheese from milk, the steps of preparing lipase from a culture of *Mycotorula lipolytica*, centrifuging the material to remove the cells from the lipase, and subjecting pasteurized and homogenized milk to the action of said lipase under temperatures of from 28° to 33° C., setting the milk to form a curd, separating the curd, and ripening the cheese.

7. In a process of the character set forth for preparing blue-veined cheese, the steps of subjecting pasteurized and homogenized milk to the action of a lipase enzyme system obtained from cultures of *Mycotorula lipolytica* under conditions of temperature and hydrogen ion concentration favorable to the action of the enzyme, setting the milk by the addition of a lactic culture and rennet, separating the curd, and ripening the cheese.

8. In a process of the character set forth for the preparation of blue-veined cheese, the steps of subjecting pasteurized and homogenized milk to the action of a lipase enzyme system obtained from cultures of *Mycotorula lipolytica* under conditions of temperature and hydrogen ion concentration favorable to the action of the enzyme, setting the milk by the addition of a lactic culture and rennet, cutting the curd, separating the curd from the whey, salting the curd, and ripening the curd to form the blue-veined cheese.

F. EUGENE NELSON.
ISAAC I. PETERS.

REFERENCES CITED

The following references are of record in the file of this patent:

UNITED STATES PATENTS

| Number | Name | Date |
|---|---|---|
| 2,132,077 | Lane | Oct. 4, 1938 |
| 2,360,556 | Fabricius | Oct. 17, 1944 |

OTHER REFERENCES

"Bacteriology of Cheese," Research Bulletin 237, August 1938, Agricultural Experiment Station, Iowa State College, Dairy Industry Section, Ames, Iowa, pages 202–205, 220, 232, 233 and 234.